(12) United States Patent
Adham et al.

(10) Patent No.: US 10,965,475 B2
(45) Date of Patent: Mar. 30, 2021

(54) PHYSICAL UNCLONABLE FUNCTION (PUF) SECURITY KEY GENERATION

(71) Applicant: Taiwan Semiconductor Manufacturing Company, Ltd., Hsinchu (TW)

(72) Inventors: Saman M. I. Adham, Hsinchu (TW); Shih-Lien Linus Lu, Hsinchu (TW); Peter Noel, Hsinchu (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 237 days.

(21) Appl. No.: 16/171,747

(22) Filed: Oct. 26, 2018

(65) Prior Publication Data
US 2019/0165956 A1 May 30, 2019

Related U.S. Application Data

(60) Provisional application No. 62/591,957, filed on Nov. 29, 2017.

(51) Int. Cl.
| | |
|---|---|
| *H04L 9/32* | (2006.01) |
| *H04L 9/08* | (2006.01) |
| *G06F 21/72* | (2013.01) |
| *G06F 21/73* | (2013.01) |

(52) U.S. Cl.
CPC ............ *H04L 9/3278* (2013.01); *G06F 21/72* (2013.01); *G06F 21/73* (2013.01); *H04L 9/0838* (2013.01); *H04L 9/0866* (2013.01); *H04L 2209/12* (2013.01); *H04L 2209/34* (2013.01)

(58) Field of Classification Search
None
See application file for complete search history.

(56) References Cited

U.S. PATENT DOCUMENTS

| | | | |
|---|---|---|---|
| 7,222,040 B1 * | 5/2007 | Nishino | G06F 11/006 702/117 |
| 9,584,329 B1 * | 2/2017 | Trimberger | H04L 9/3278 |
| 2015/0092939 A1 * | 4/2015 | Gotze | H04L 9/0866 380/2 |
| 2015/0178143 A1 * | 6/2015 | Mathew | G06F 7/00 714/5.1 |
| 2015/0278505 A1 * | 10/2015 | Lu | G06F 21/44 726/19 |

\* cited by examiner

*Primary Examiner* — J. Brant Murphy
*Assistant Examiner* — Hassan Saadoun
(74) *Attorney, Agent, or Firm* — Merchant & Gould P.C.

(57) ABSTRACT

Systems and methods of generating a security key for an integrated circuit device include generating a plurality of key bits with a physically unclonable function (PUF) generator. Unstable bits of the plurality of key bits are identified, and a security key is generated based on the plurality of key bits, wherein the security key excludes the identified unstable bits.

20 Claims, 6 Drawing Sheets

PHYSICAL UNCLONABLE FUNCTION (PUF) SECURITY KEY GENERATION

CROSS-REFERENCE TO RELATED APPLICATION

This application claims the benefit of U.S. Provisional Patent Application No. 62/591,957, filed on Nov. 29, 2017, which is incorporated reference in its entirety.

BACKGROUND

As reliance on computer systems and the internet increases in many areas such as personal communications, shopping, banking, commerce, etc., the need for improved cyber security also increases. Many security measures may be employed, including cryptography. A physical unclonable function (PUF) is a physical object embodied in a physical structure that can be used to produce an output. The output is easy to evaluate but the output is very hard or nearly impossible to predict. A PUF can be used as a unique identification or key in secure computing and communication.

An individual PUF device must be easy to make but practically impossible to duplicate, even given the exact manufacturing process that produced it. In this respect it is the hardware analog of a one-way function. PUFs are typically implemented in integrated circuits and are typically used in applications with high security requirements.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
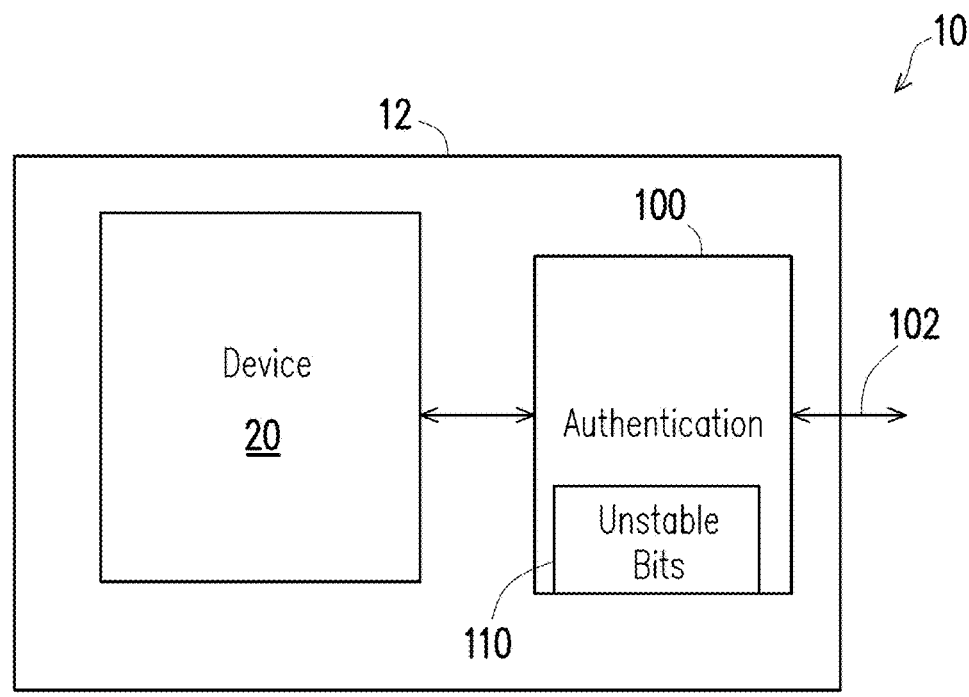
FIG. 1 is a block diagram illustrating aspects of an example system for generating a physically unclonable function (PUF) security key in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

As noted above, a physical unclonable function (PUF) is a physical object embodied in a physical structure that can be used to produce an output that is easy to evaluate but nearly impossible to predict. Integrated circuit (IC) devices generally include electronic circuits formed on a semiconductor substrate, or "chip," formed of a semiconductor material such as silicon. Components of IC devices are formed on the substrate by a photolithography process rather than being constructed one item at a time. The electronic devices formed on the substrate are interconnected by conductors, or wires, also formed on the substrate by photolithographic processes. Although manufactured in high volume, each IC device is unique due to physical randomness, even with the same manufacturing processes materials. This inherent variation can be extracted and used as its unique identification, as DNA to human beings. In accordance with embodiments disclosed herein, such variation is used to create a unique IC device signature used as a PUF, since it is unique, inherent to the particular device, unclonable (cannot be mimicked or duplicated), repeatable, etc.

FIG. 1 is a block diagram illustrating an example of an integrated circuit device 10 in accordance with aspects of the present disclosure. The integrated circuit device 10 includes a substrate 12 that forms an electronic device 20, which could be any of various types of devices implemented by an integrated circuit, such as a processing or memory device. An authentication circuit 100 is configured to receive a challenge via an input/output port 102. In response to the challenge, the authentication circuit is configured to provide a response in the form of a security key, which is output by a PUF generation circuit. As noted above, a PUF is constructed based on the occurrence of different physical process variations during the manufacturing of an IC. These static physical variations allow an IC to have a unique fingerprint (or multiple unique fingerprints) particular to the IC. When a particular challenge received via the input/output port 102, a corresponding unique response is generated. An IC that is capable of generating multiple fingerprints is a strong PUF, since multiple challenge and response pairs are available.

With some PUF generation techniques, some potential security key bits may vary from one PUF generation to another. In this disclosure, such key bits are referred to as unstable bits. In general, these unstable bits are not suitable to be used for key generation because messages encrypted with a key having unstable bits may not be deciphered reliably. Collecting and identifying the location of the useful bits becomes very important to generate a unique and reliable key per IC device. In some examples disclosed herein, rather than keeping a record of stable key bits for use in generating security keys, records of unstable bits are maintained. In the embodiment shown in FIG. 1, the unstable bits are stored in the memory 110. Generating the security key includes accessing the unstable bits memory 110, and then outputting a response key that excludes the identified unstable bits.

Figure 2:
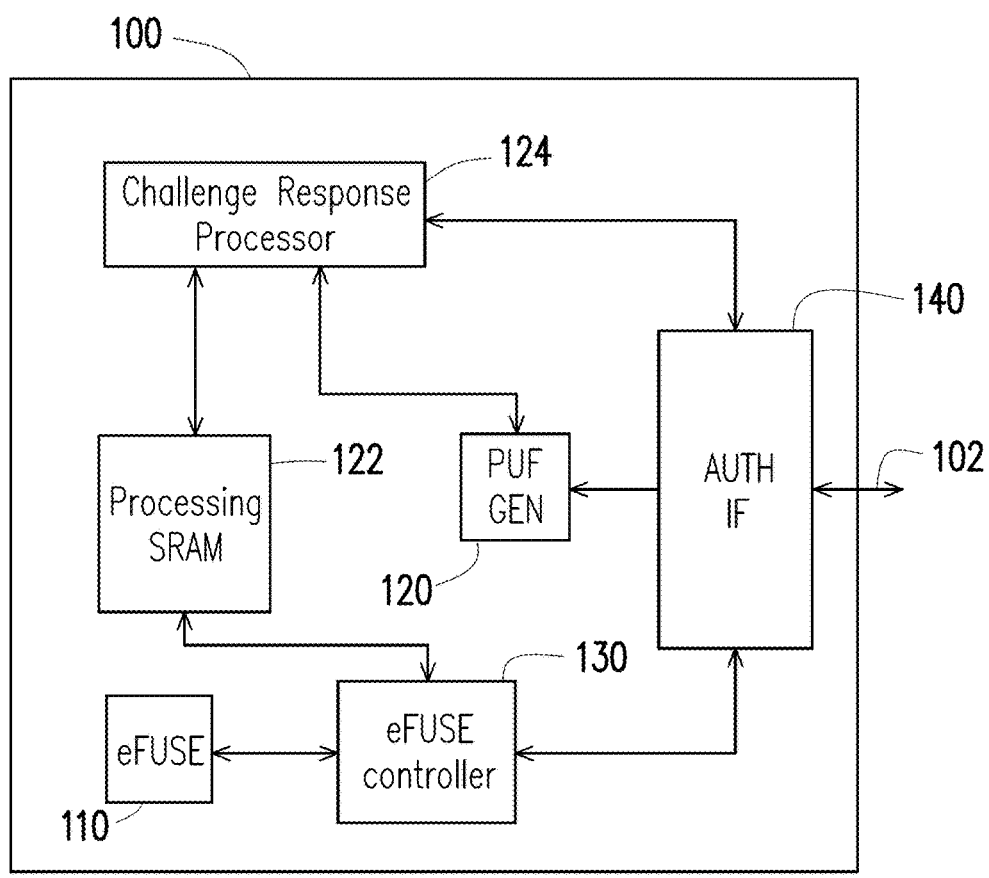
FIG. 2 is a block diagram illustrating aspects of an example authentication circuit of FIG. 1 in accordance with some embodiments.

FIG. 2 illustrates further aspects of an example of the authentication circuit 100. A PUF generator 120 is configured to generate a security key that includes a predefined number of key bits. As noted above, the security key is provided in response to a received challenge, and is unique to the particular IC device 10 due to inherent variations resulting from the manufacturing process for the device. In some examples, the PUF generator 120 includes a memory array, such as an SRAM memory array, where the memory cells of the array generate key bits of the security key. The size of the SRAM array may be determined based on the size of the required security key(s).

Processing memory 122 is provided for PUF data processing. In the illustrated example, the processing memory 122 is an SRAM. A request for a security key is received in the form of a challenge. A challenge-response processor 124 handles such a request, or challenge, to ensure correctness of the challenge before presenting the challenge to the PUF generator 120. Based on a valid response, a security key is generated by the PUF generator 120. In some examples, the challenge-response processor 124 processes the response by removing bits that are not useful and ensures the correct size of the security key is generated.

In the particular embodiment shown in FIG. 2, the unstable bits memory 110 comprises a nonvolatile memory provided on the device 10 itself. In other examples, the unstable bits memory is located external to the device 10. In FIG. 2, the unstable bits memory 110 is an eFUSE nonvolatile memory, which marks the address(es) of identified unstable bits in the PUF. As will be discussed further below, initially the unstable bits memory 110 contains no information. During a commissioning process, the unstable bits memory 110 is updated with unstable bit addresses at the end of each of a plurality of test steps. At the end of all the test steps, the unstable bits memory 110 will contain information about all unstable bits. This information is used by the challenge-response processor to generate the security key in response to a received challenge. The illustrated example further includes an unstable bits memory controller 130. In examples where the unstable bits memory 110 is implemented via an eFUSE, the memory controller 130 interfaces with the unstable bits memory 110 for read and write modes.

The illustrated authentication circuit 100 further includes an authentication interface 140, which is a state machine that provides an interface external to the device 10. For example, the authentication interface 140 initiates access to the PUF generator and keeps track of all transactions related to the PUF access and data collection.

A PUF generator obtains the inherent differences among manufactured devices to generate the PUF signature. For example, there are delay chain based PUFs, wherein the PUF translates variations (difference) into delay variances. They employ a set of delay chains made out of logic gates. Due to static variations of components, each chain will have different delay. By sampling the delay, a signature can be produced.

Another approach is a memory-based PUF, wherein variations of devices in a bi-stable element are translated to generate either a "1" or "0". Such a memory-based PUF includes a memory cell array that may be implemented as any of a variety of memory cell arrays such as SRAM, DRAM, MRAM, RRAM, ROM, etc. A particular type of memory-based PUF is an SRAM PUF. These PUFs utilize small memory cell variations to produce signatures. For example, one type of SRAM PUF gets its signatures from the start up states of cells.

In some embodiments, the PUF generator includes a memory array upon which the PUF is based. For example, such an SRAM-based PUF uses the memory initial data content (power up condition) to generate the security keys. Bits of the generated key that do not change state from one power up cycle to the next are referred to as stable bits. However, attempting to identify and record each stable bit to be used for key generation would require a significant amount of time, and recording the stable bits could possibly expose the key generation to side attacks. In addition, it would require a significant number of additional bits to correct errors due to environmental effects, noise and aging that might affect the stable bits of the memory.

In accordance with examples disclosed herein, unstable bits are identified using information available at the die manufacturing stage. Unstable bit identification is accumulated throughout various die test stages and conditions. The unstable bit information is used to generate a security key or multiple keys. The identified unstable bits may be stored in the unstable bit memory 110, such as a nonvolatile memory provided on chip, or the unstable bits may be stored off chip as part of a security server database.

As noted above, some examples implement the PUF generator via an SRAM memory. For example, a PUF signature may be generated by using power-on states of an SRAM device. Even though an SRAM device includes symmetric cells (bits), manufacturing variability may still cause each bit of the SRAM device to tend to be at a high state (i.e., a logical "1") or at a low state (i.e., a logical "0") while the SRAM device is powered on. Such initial power-on states of the bits are randomly distributed across the whole SRAM device, which gives rises to a variability that can be defined by a PUF to produce a unique key of the SRAM device.

In other embodiments where an SRAM is used as a PUF generator, each bit of a security key is generated by comparing accessing speeds (e.g., reading speeds) of two memory cells of the memory device. In such examples, since the PUF signature is based on the comparison of reading speeds, no iteration to power up and down the memory device is required.

Figure 3:
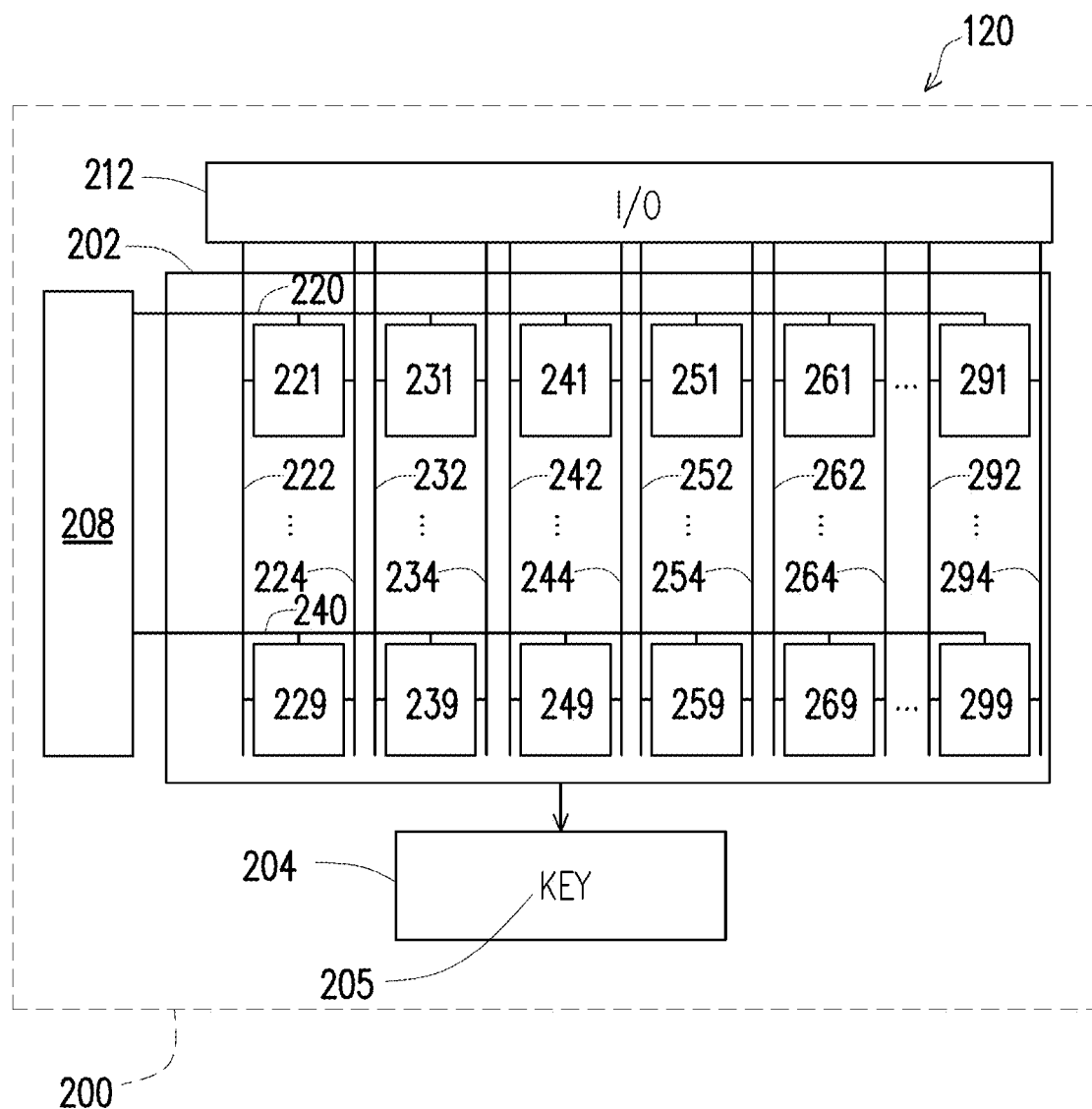
FIG. 3 is a block diagram illustrating aspects of an example static random access memory (SRAM) of the PUF generator of FIG. 2 in accordance with some embodiments.

FIG. 3 illustrates portions of an exemplary SRAM circuit 200 used to implement the PUF generator 120 in some embodiments. The SRAM implementing the PUF generator 120 includes a plurality of cells that generate bits of the security key. The SRAM 200 includes a memory cell array 202, a PUF generation circuit 204, a row decoder 208, and an I/O circuit 212.

The SRAM memory cell array 202 includes a plurality of SRAM memory cells (e.g., 221, 229, 231, 239, 241, 249, 251, 259, 261, 269, 291, 299) arranged in a column-row configuration. One or more cells may be disposed between the cells 221 and 229, 231 and 239, and so on. Each column of memory cells has a respective pair of bit lines (BL) and bit lines bar (BLB) that are coupled to the cells in that column, and each row has a respective word line (WL) that is coupled to multiple cells that respectively belong to multiple columns. For example, as illustrated in the SRAM cell array 202 of FIG. 3, the leftmost column has BL 222 and BLB 224, the next column has BL 232 and BLB 234, and so on. The cells of each column are coupled to the respective column's BL and BLB. For example, in FIG. 3, the cells 221 and 229, and any cells coupled therebetween are each coupled to the BL 222 and BLB 224. Further, the cells 221, 231, 241, 251, 261, and up to 291 arranged in the top row a are each coupled to the WL 220; and the cells 229, 239, 249, 259, 269, and up to 299 arranged in the bottom row are each coupled to the WL 240.

The I/O circuit 212 is coupled to the BL and BLB of each column. For example, the I/O circuit 212 includes a plurality of sense amplifiers that are coupled to the BL 222 and BLB 224 of each respective column of the memory array 202. Such sense amplifiers of the I/O circuit 212 are each configured to compare a voltage difference between the coupled BL and BLB to which a cell is coupled so as to read bit data stored in that cell.

The PUF generation circuit 204 is coupled to each cell of the memory array, whereby the cells of the memory array comprise key bits of the security key 205 that is output in response to the receive challenge. In the illustrated example, each of the key bits of the security key 205 is generated by comparing accessing speeds of two memory cells of the memory device 200.

Figure 4:
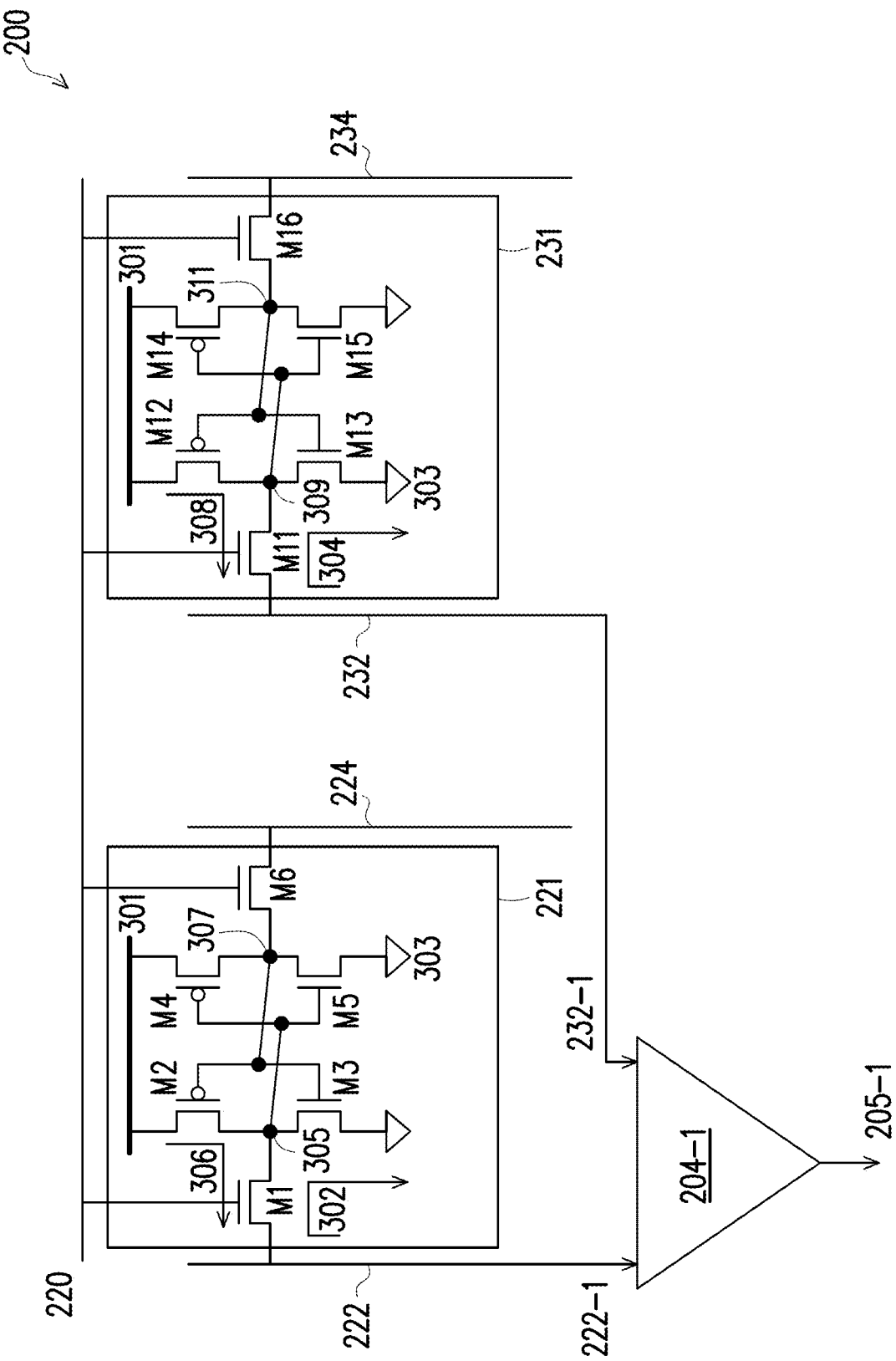
FIG. 4 is a circuit diagram illustrating further aspects of the example SRAM PUF generator of FIG. 3.

FIG. 4 illustrates details of two adjacent memory cells 221 and 231 of the SRAM cell array 202. The memory cells 221 and 231 are coupled to a sense amplifier 204-1 of the PUF generation circuit 204. While the memory cells 221 and 231 are each implemented as a 6-transistor SRAM (6T-SRAM) cell, the SRAM 200 is not limited to being implemented as a 6T-SRAM cell.

Referring still to FIG. 4, cell 221 includes transistors M1, M2, M3, M4, M5, and M6; and cell 231 includes transistors M11, M12, M13, M14, M15, and M16. In some embodiments, the cells 221 and 231 are substantially similar to each other, that is, transistor M1 is substantially similar to transistor M11; transistor M2 is substantially similar to transistor M12; transistor M3 is substantially similar to transistor M13; transistor M4 is substantially similar to transistor M14; transistor M5 is substantially similar to transistor M15; and transistor M6 is substantially similar to transistor M16. Thus, for clarity, the following discussions of configurations and operations of the transistors of the cell will be directed to the cell 221 only.

As illustrated in FIG. 4, the transistor M2 and M3 are formed as a first inverter and the transistors M4 and M5 are formed as a second inverter wherein the first and second inverters are coupled to each other. More specifically, the first and second inverters are each coupled between a first voltage reference 301 and second a voltage reference 303. Generally, the first voltage reference 301 is a voltage level of a supply voltage Vdd applied on the cell 221, and the second voltage reference 303 is ground. The first inverter is coupled to the transistor M1, and the second inverter is coupled to the transistor M6. In addition to being coupled to the inverters, the transistors M1 and M6 are both coupled to a WL 220 and each are coupled to bit line BL 222 and BLB 224, respectively.

In general, when an SRAM cell stores a data bit, a first node of the SRAM cell is configured to be at a first logical state (1 or 0), and a second node of the SRAM cell is configured to be at a second logical state (0 or 1), wherein the first and second logical states are complementary with each other. In some embodiments, the first logical state at the first node is the data bit stored by the SRAM cell. For example, the illustrated embodiment of FIG. 4 includes nodes 305 and 307. When the cell 221 stores a data bit (e.g., a logical 1), the node 305 is configured to be at the logical 1 state, and the node 307 is configured to be at the logical 0 state.

To generate the key 205, in some embodiments, initially, a data bit (e.g., either a logical 1 or 0) is written to each of the cells in the SRAM array 202 to be read. Following the write operation(s), a row decoder of the SRAM 200 receives a row address to locate (determine) a WL at that row address and then the WL is asserted by a row decoder. In response to the WL being asserted (e.g., 220), the access transistors (e.g., M1, M6, M11, M16), disposed along and coupled to the WL, are activated (i.e., turned on). In some examples, all or part of the BLs and BLBs (e.g., 222, 224, 232, and 234) of the SRAM 200 are either pre-charged to Vdd or pre-discharged to ground. Then the data bit stored (being written) in each cell (e.g., 221 . . . etc.) of the row (i.e., along the asserted WL) is read through the cell's respectively coupled BL (e.g., 222) and BLB (e.g., 224).

While the data bits are being read, the sense amplifier 204-1 coupled to the BLs 221-1, 232-1 compares reading speeds (i.e., either the charging rates or the discharging rates) of the two adjacent cells. In response to the comparison, the sense amplifier 204-1 generates a bit (e.g., 205-1) of the security key 205. As such, for a particular row (WL) being asserted, a first plurality of bits (e.g., 205-1, 205-2, 205-3 . . . 205-4) of the security key 205 may be (simultaneously) generated by the sense amplifiers of the authentication circuit 204. In some embodiments, each of the other rows (WLs) in the memory cell array is subsequently asserted. Accordingly, one or more pluralities of bits of the PUF signature may be generated by the sense amplifiers of the authentication circuit 204.

Figure 5:
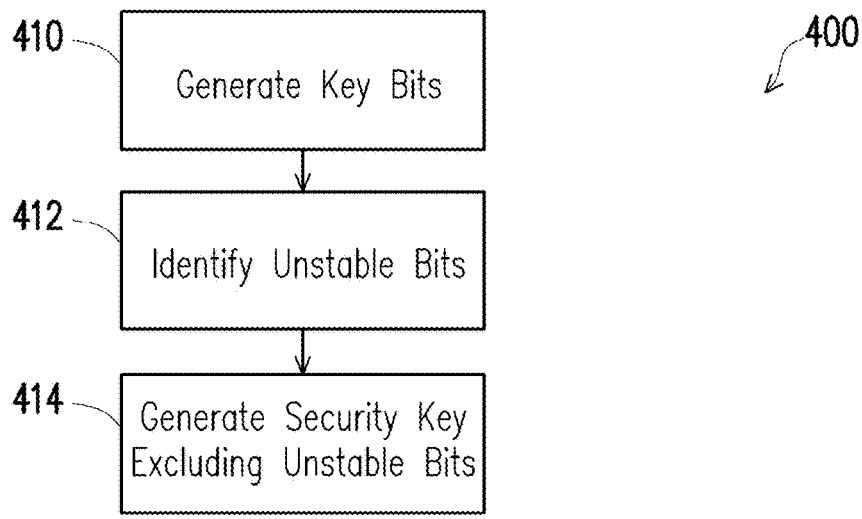
FIG. 5 is a process flow diagram illustrating aspects of a method for generating a PUF security key in accordance with some embodiments.

FIG. 5 is a process flow diagram generally illustrating aspects of an example method 400 for generating a security key, such as the security key 205 discussed above. At block 410, a plurality of key bits are generated. As noted previously, the key bits may be generated by a PUF generator implemented via an SRAM memory array such as the array 202, for example. At block 412, at least one unstable bit of the plurality of key bits generated in block 410 is identified. As used herein, unstable bits are security key bits that vary from one PUF generation to another. At block 414, a security key is generated, such as the security key 205. The security key generated in block 414 excludes identified unstable bits.

In some implementations, the integrated circuit device chip 10 goes through a commissioning phase to identify and to register the chip PUF, which may include creating a challenge-response reference database that is saved in a suitable computer device. For example, the challenge-response reference database may be saved as part of a security database of a server that intends to authenticate the integrated circuit device 10.

Figure 6:
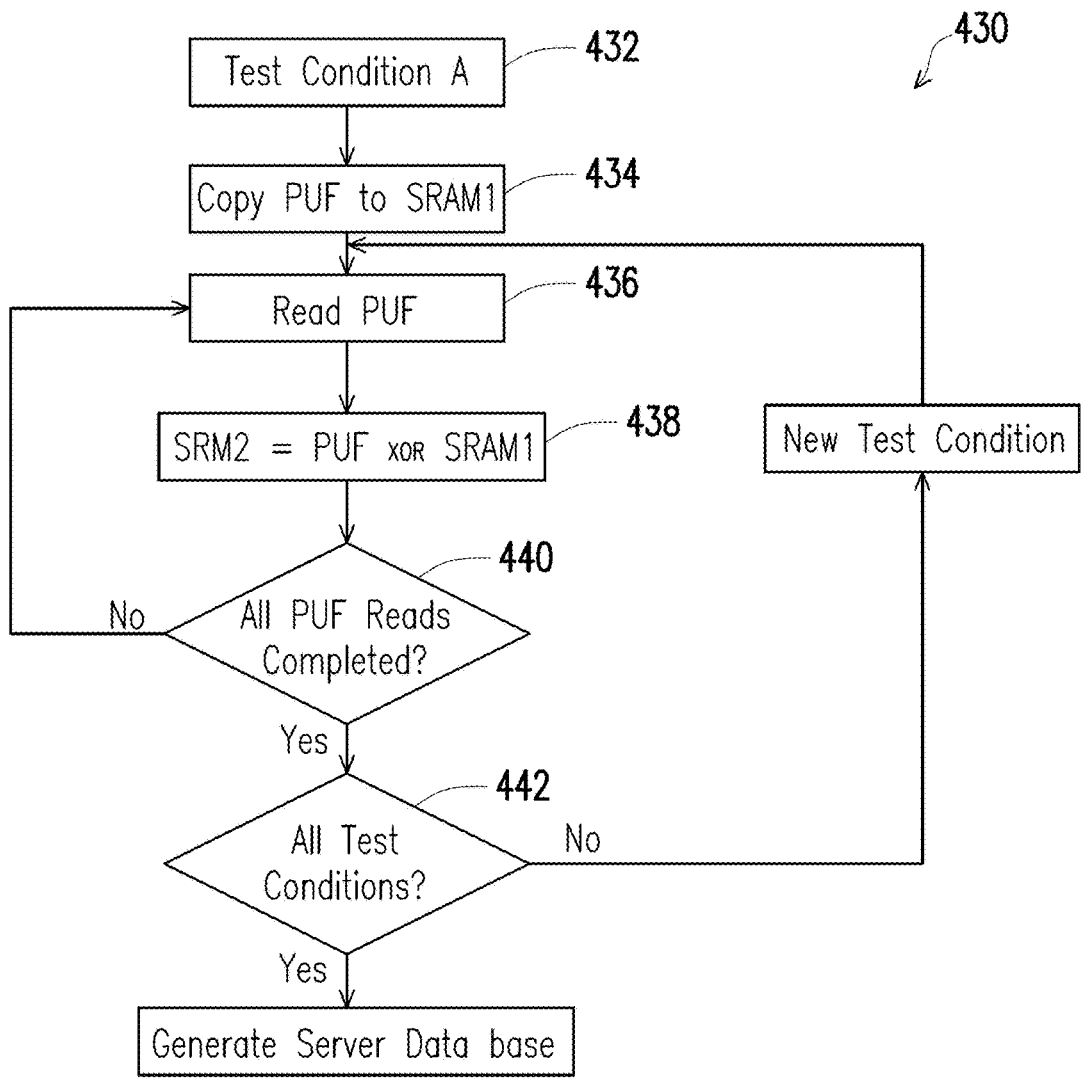
FIG. 6 is a process flow diagram illustrating further aspects of an example method for generating a PUF security key in accordance with some embodiments.

The database is generated from test data collected at a plurality of test stages. As noted above, saving unstable bits in an on-chip memory may reduce the amount of data eventually saved on an external server. FIG. 6 illustrates an example process 430 that may be used to generate one or more security keys. In general, PUF data are collected for a plurality of test conditions, such as varying temperatures, voltage levels, etc. Block 432 shows a first test condition A.

For this test condition, the PUF is read from the PUF generator 120 (FIG. 2) at block 434, and copied to a first memory, such as the processing SRAM 122.

The PUF is read multiple times to identify bits that vary from one PUF generation to another—the unstable bits. Thus, each occurrence of generated PUF is read at block 436 and compared to the earlier occurrence of the PUF data saved in the first memory. Thus, as shown at block 438, for each read of the generated PUF at block 436, a second memory (i.e. the unstable bits memory 110) is updated with data indicating unstable bits (bits that change from one read to another). This continues until all PUF reads are completed as determined in the decision block 440. In some examples, the PUF is read at least five times.

Figure 7:
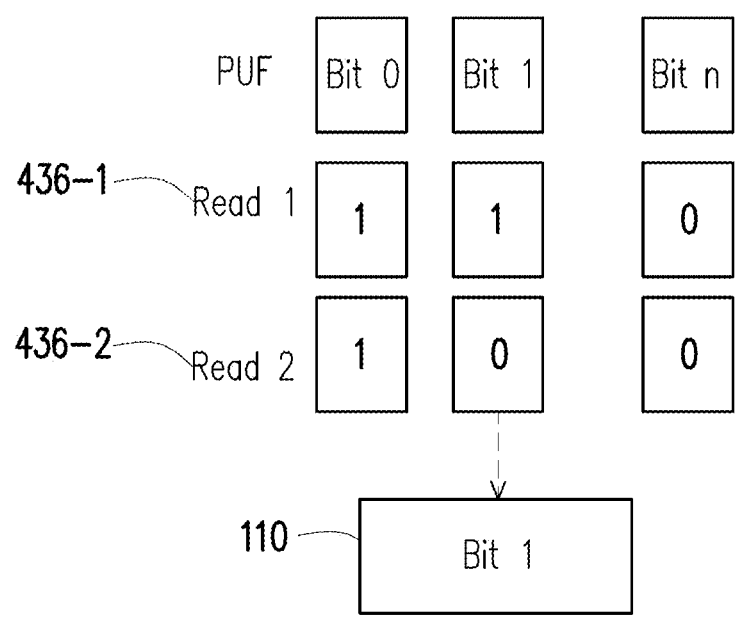
FIG. 7 is a block diagram illustrating further aspects of an example method for generating a PUF security key in accordance with some embodiments.

FIG. 7 provides an example conceptually illustrating the process of updating the unstable bits memory 110. Various bits (bit 0, bit 1 to bit n) of the generated PUF are illustrated. Data obtained from the first read 436-1 results in 1, 1, 0 for bit 0, bit 1, and bit n, respectively. Data obtained from the second read 436-2 results in 1, 0, 0 for bits bit 0, bit 1, and bit n, respectively. Since the data read for bit 1 changed from the first read 436-1 to the second read 436-2, the XOR function of block 438 identifies bit 1 as an unstable bit, which is saved in the unstable bits memory 110.

Returning to FIG. 6, when all of the PUF reads have been completed as indicated in the decision block 440, the unstable bits memory 110 will contain all of the identified unstable bits. As determined in decision block 442, if additional test conditions remain, the process is repeated to identify further unstable bits. Once the process is complete, the unstable bits may be saved to an external server database.

In some examples, the challenge (C) is provided as a memory address. Generating the server database thus requires reading the security key 205 from the address contained in the challenge, and removing the unstable bits as identified by the unstable bits memory 110 to generate the security key response corresponding to the challenge address. By eliminating the unstable bits, the security key is comprised of only stable bits. In some embodiments, error correction code (ECC) is further calculated for the response. The ECC helps ensure correct security key generation under extreme environments, for example. Such conditions could include those that exceed the conditions experienced during the commissioning tests. The challenge-response database, for example, thus includes the security key response bits (R) stored along with the ECC bits (ECC) as pair: C(R,ECC).

Figure 8:
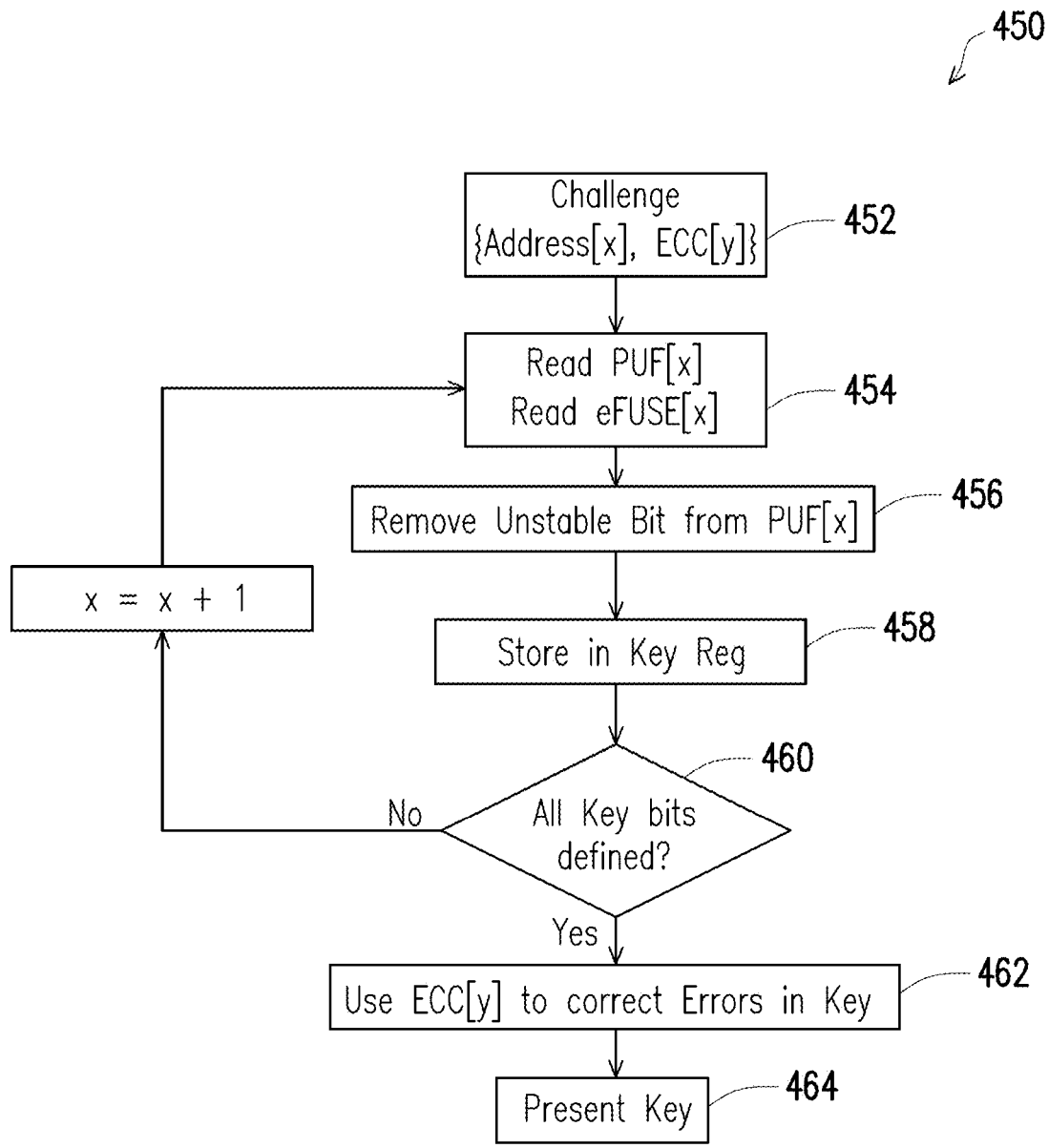
FIG. 8 is a process flow diagram illustrating further aspects of an example challenge and response process in accordance with some embodiments.

FIG. 8 illustrates an example of a challenge-response process 450. The processes shown in FIG. 8 are discussed in conjunction with FIGS. 1 and 2. At block 452, a challenge is received, such as from a server desiring to authenticate the device 10. The challenge is composed of a challenge address (Address[x]) and Error Correction Code bits (ECC[y]). A Strong PUF supports multiple (x, y) pairs. Upon receiving the challenge, the challenge-response processor 124 of the authentication circuit 100 reads the bits corresponding to the challenge address[x] generated by the PUF generator 120 in block 454. The read PUF data is then processed to remove (filter) the unstable bits at block 456. This includes, for example, accessing the unstable bits memory 110 to identify the unstable bits of the generated PUF data. The challenge-response processor 124 sores the key bits in a key register as shown at block 458, and the process is repeated until all the key bits have been read as determined in block 460. In block 462 the ECC part of the challenge ECC[y] is then used to correct any error in the filtered data to achieve the final security key. At block 464 the key is presented as the response from the challenge response process 450.

Thus, disclosed embodiments include a method of generating a security key for an integrated circuit device that includes generating plurality of key bits, identifying one or more unstable bits of the plurality of key bits, and generating a security key based on the plurality of key bits, wherein the security key excludes the at least one unstable bit.

In accordance with further disclosed embodiments, an integrated circuit device includes a PUF generator configured to output a plurality of key bits. A memory stores unstable bits of the plurality of key bits, and a controller is configured to generate a security key in response to receiving a challenge, wherein generating the security key includes accessing the memory and excluding the unstable bits from the security key.

In accordance with still further disclosed embodiments, a system for generating an integrated circuit device security key includes a first memory storing a first occurrence of a first key bit, and a PUF generator configured to output a plurality of key bits, including a second occurrence of the first key bit. A processor is configured to compare the first and second occurrences of the first key bit to identify an unstable key bit.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method of generating a security key for an integrated circuit device, comprising:
   providing a physically unclonable function (PUF) generator that includes a plurality of memory cells;
   generating a plurality of key bits, wherein each of the key bits is generated based on comparing access speeds of two of the plurality of memory cells to each other;
   identifying at least one unstable bit of the plurality of key bits; and
   generating a security key based on the plurality of key bits, wherein the security key excludes the at least one unstable bit.

2. The method of claim 1, further comprising saving addresses of the unstable bits in a memory, wherein the memory does not store stable bits of the plurality of key bits.

3. The method of claim 1, wherein the memory is located on the integrated circuit device.

4. The method of claim 1, wherein the memory is located external to the integrated circuit device.

5. The method of claim 1, wherein the generating the plurality of key bits includes writing a predetermined data bit to each of the memory cells, and comparing read speeds of the two of the plurality of memory cells to each other.

6. The method of claim 1, further comprising receiving a challenge address, and wherein the security key is generated further in response to the received challenge address.

7. The method of claim 6, wherein the security key further includes an error correction code.

8. The method of claim 1, wherein identifying the at least one unstable bit comprises:
   generating a first occurrence of the security key under a first test condition;
   generating a second occurrence of the security key under the first test condition; and
   comparing the key bits of the first and second occurrences of the security key.

9. The method of claim 8, further comprising:
   generating a third occurrence of the security key under a second test condition;
   generating a fourth occurrence of the security key under the second test condition; and
   comparing the key bits of the third and fourth occurrences of the security key.

10. The method of claim 1, further comprising:
    generating a plurality of security keys that includes the security key;
    determining a plurality of challenge addresses corresponding to the plurality of security keys; and
    storing the plurality of security keys and associated challenge addresses in a database.

11. An integrated circuit device, comprising:
    a PUF generator configured to output a plurality of key bits;
    a memory storing unstable bits of the plurality of key bits, wherein the memory does not store stable bits of the plurality of key bits;
    a controller configured to generate a security key in response to receiving a challenge, wherein generating the security key includes accessing the memory and excluding the unstable bits from the security key.

12. The integrated circuit device of claim 11, wherein the memory is external to the integrated circuit device.

13. The integrated circuit device of claim 11, wherein the PUF generator includes a plurality of memory cells.

14. The integrated circuit device of claim 13, wherein the memory cells are SRAM memory cells, and wherein the PUF generator is configured to compare access speeds of two of the plurality of memory cells to each other.

15. The integrated circuit device of claim 11, wherein the security key further includes an error correction code.

16. The integrated circuit device of claim 15, wherein the challenge includes a security key address and an error correction code bit.

17. The integrated circuit device of claim 10, wherein the memory comprises a nonvolatile memory.

18. A system for generating an integrated circuit device security key, comprising:
    a first memory storing a first occurrence of a first key bit;
    a PUF generator configured to output a plurality of key bits, including a second occurrence of the first key bit; and
    a processor configured to compare the first and second occurrences of the first key bit to identify an unstable key bit and store the identified unstable key bit in a second memory, wherein the second memory does not store stable key bits.

19. The system of claim 18, wherein the second memory is external to the integrated circuit device.

20. The system of claim 18, wherein the PUF generator is configured to compare an access speed of a first memory cell to an access speed of a second memory cell to generate each of the plurality of key bits.

* * * * *